United States Patent [19]
Cotter et al.

[11] Patent Number: 5,883,571
[45] Date of Patent: Mar. 16, 1999

[54] DEVICE AND METHOD FOR GENERATING AN AUDIBLE SIGNAL IN A MOTOR VEHICLE

[75] Inventors: Chester F. Cotter, Beauford, S.C.; David P. Nilsen, Rutland, Vt.; Richard Gruskos, Oceanport, N.J.

[73] Assignee: Darlington Cotter Associates, New York, N.Y.

[21] Appl. No.: 856,091

[22] Filed: May 14, 1997

[51] Int. Cl.[6] ........................................ B60Q 1/22
[52] U.S. Cl. .................. 340/463; 340/429; 340/438; 340/439; 340/436; 340/689; 200/61.45 R; 200/61.52; 180/172
[58] Field of Search ...................... 340/463, 429, 340/438, 439, 466, 566, 436, 665, 689; 200/61.45 R, 61.49, 61.51, 61.52; 701/29, 30; 180/170–172

[56] References Cited

U.S. PATENT DOCUMENTS

| | | |
|---|---|---|
| 1,589,071 | 6/1926 | Hahnle . |
| 2,283,659 | 5/1942 | White . |
| 2,301,344 | 11/1942 | Tibbetts . |
| 2,340,502 | 2/1944 | Baker . |
| 2,448,597 | 9/1948 | Jolley et al. ............................ 340/429 |
| 2,450,933 | 10/1948 | Bell . |
| 2,681,957 | 6/1954 | Schneider . |
| 3,715,533 | 2/1973 | Seaton ...................................... 340/429 |
| 3,798,593 | 3/1974 | Sartor ................................ 200/61.45 R |
| 3,999,178 | 12/1976 | Hamilton .......................... 200/61.45 R |
| 4,278,969 | 7/1981 | Woods .................................... 180/171 |
| 4,345,238 | 8/1982 | Weir ................................. 200/61.45 R |
| 4,671,111 | 6/1987 | Lemelson ................................ 340/539 |
| 5,012,221 | 4/1991 | Neuhaus et al. . |
| 5,473,307 | 12/1995 | Lam ........................................ 340/429 |

FOREIGN PATENT DOCUMENTS 1 555 571  8/1970  Germany .

*Primary Examiner*—Donnie L. Crosland
*Attorney, Agent, or Firm*—Kenyon & Kenyon

[57] ABSTRACT

A device for generating an audible signal using an audible unit of a motor vehicle, particularly when the motor vehicle performs an evasive maneuver. The device includes a striking member situated substantially in the motor vehicle; the striking member includes a contacting portion. The device also includes an enclosing member situated in a close proximity to the striking member; the enclosing member includes a contacting unit electrically connected to the striking member for generating an activating signal when the motor vehicle is performing an evasive maneuver. The device further includes a third unit having a first end for electrically communicating with the enclosing member. The third unit also has a second end providing an output signal to the audible unit of the motor vehicle in response to the activating signal, and the output signal being provided for a predetermined time period.

15 Claims, 5 Drawing Sheets

DEVICE AND METHOD FOR GENERATING AN AUDIBLE SIGNAL IN A MOTOR VEHICLE

BACKGROUND INFORMATION

Conventional systems for generating an audible signal in a motor vehicle (for example, as described in U.S. Pat. No. 2,283,659) include a control system which provides a sound warning signal of relatively low volume or relatively short duration suitable for city driving and a signal of longer duration having a higher volume for highway driving. This control system has two horns of which only one horn is active in city traffic, while both are active in highway traffic. The horns are controlled by either an activation of an air fan for grounding a heating coil, a heat exhaust temperature sensor, an accelerator pedal sensor or a brake pedal sensor.

Another conventional system for generating an audible signal in the motor vehicle is described in U.S. Pat. No. 5,012,221. This system is an audible warning system used in emergency vehicles and provides different selectable sounds to indicate various levels of urgency. In particular, the system is coupled to a speed sensor (or to an electromagnetic device) so that the output of an audible waveform generator is controlled by the speed sensor. Therefore, an amplitude and frequency of sound are modified based on an output of the speed sensor or an output of the electromagnetic device.

The conventional systems for generating an audible signals in a motor vehicle do not, however, provide any audible indication whenever a dangerous situation occurs or is about to occur. It is therefore an object of the present invention to provide a device to warn motor vehicles of a possible impending danger when another motor vehicle is performing an evasive maneuver. It is also an object of the present invention for such a device to include an audible horn with a variable output that modifies a pitch and/or volume of emitted audible signal during city driving (e.g., below 25 mph), normal driving (e.g., 25–50 mph) and highway driving (e.g., above 50 mph).

SUMMARY OF THE INVENTION

The present invention relates to a device and method for automatically generating an audible signal using an audible unit of a motor vehicle. The device includes a striking member, which includes a contacting portion, situated substantially in the motor vehicle. The device also includes an enclosing member situated in close proximity to the striking member. The enclosing member includes a contacting unit electrically connected to the striking member for generating an activating signal when the motor vehicle is performing an evasive maneuver.

The device further includes a timing unit having a first end for electrically communicating with the enclosing member. The timing unit also has a second end providing an output signal to the audible unit of the motor vehicle in response to the activating signal. The output signal is provided for a predetermined time period.

It is further advantageous to provide a controller unit that modifies the pitch and/or volume of a sound emitted by the audible device when different road conditions are present (e.g., city driving, normal driving and highway driving).

DETAILED DESCRIPTION

Figure 1:
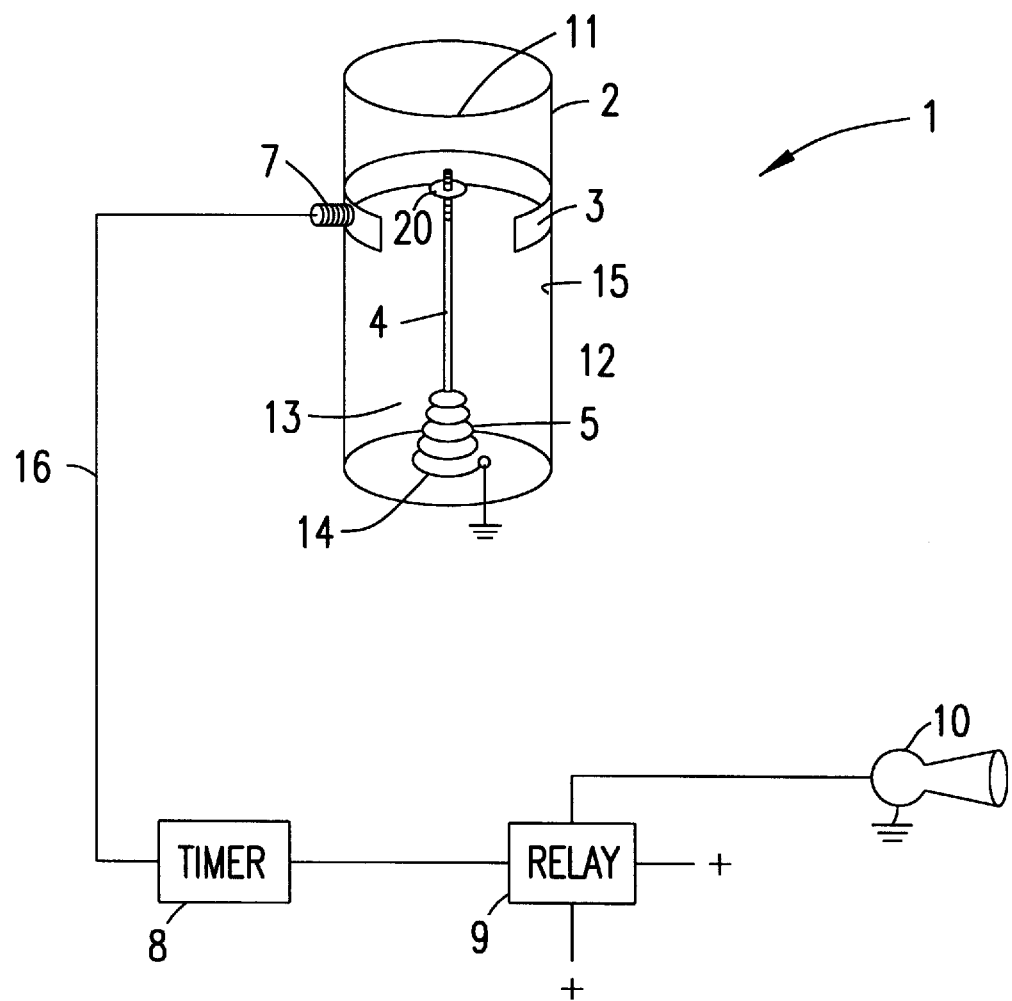
FIG. 1 shows a block diagram of a first embodiment of the device according the present invention.

FIG. 1 shows a first embodiment of the device for generating an audible signal in a motor vehicle according to the present invention. In particular, the device 1 includes an enclosing member 2 (e.g., a tubular unit), a striking member 4 and a restoring member 5. The restoring member 5 includes a contacting portion 3. The striking member 4 has a first striking end 11 for situating a contact unit 20 (e.g., a current conductive contact) thereon, and a second striking end 12 for connecting to a first restoring end 13 of the restoring member 5. The restoring member 5 is coupled to a preferably rigid surface at its second restoring end 14, and is also grounded. The restoring member 5 may preferably be a spring or another unit which biases the striking member 4 to return to a vertical orientation (if moved away from a vertical axis). Thus, the contact unit 20 of the striking member 4 is prevented from contacting the contacting portion 3 when the restoring member 5 is in a relaxed state.

The contacting portion 3 is preferably situated on an inner wall 15 of the enclosing member 2, and extends around the periphery of the inner wall 15. Preferably, the contacting portion 3 does not extend completely around the inner wall 15 and provides a gap to prevent striking member 4 from contacting the contacting portion 3 when the motor vehicle suddenly accelerates, which can be further facilitated by covering the gap with an insulator. Therefore, a false indication of an evasive maneuver may be prevented. The contacting portion 3 is electrically coupled to an electrical coupling device 7, which provides electrical signals to a timing unit 8 via a connector 16 (e.g., a wire). The timing unit 8 is electrically coupled to a relay unit 9, which is in turn coupled to an automobile horn 10.

When operating a motor vehicle, if the motor vehicle collides with an object (e.g., another motor vehicle), suddenly stops, turns or makes an evasive maneuver, the striking member 4 is urged closer to the contacting portion 3 as a result of a change of motion of the motor vehicle. If a magnitude of the change of motion of the motor vehicle is sufficiently large (which can be predefined), the contact unit 20 contacts the contacting portion 3 and completes a circuit to provide a generated signal to the electrical coupling device 7. The electrical coupling device 7 provides a first electrical signal (corresponding to the generated signal) to the timing unit 8 via the connector 16. When the first electrical signal is received in the timing unit 8, the timing unit 8 generates a second electrical signal. The second electrical signal is then provided to the relay unit 9 by the timing unit 8 for a predetermined period of time (e.g., 5 seconds).

The relay unit 9 actuates the automobile horn 10 (e.g., as a function of a duration of the second electrical signal). Thus, the sound emitted by the automobile horn 10 warns the drivers of other motor vehicles that an evasive maneuver by a nearby vehicle is currently taking place. Accordingly, the likelihood of an impact between the motor vehicles may be decreased when using the device according to the present invention.

Figure 2:
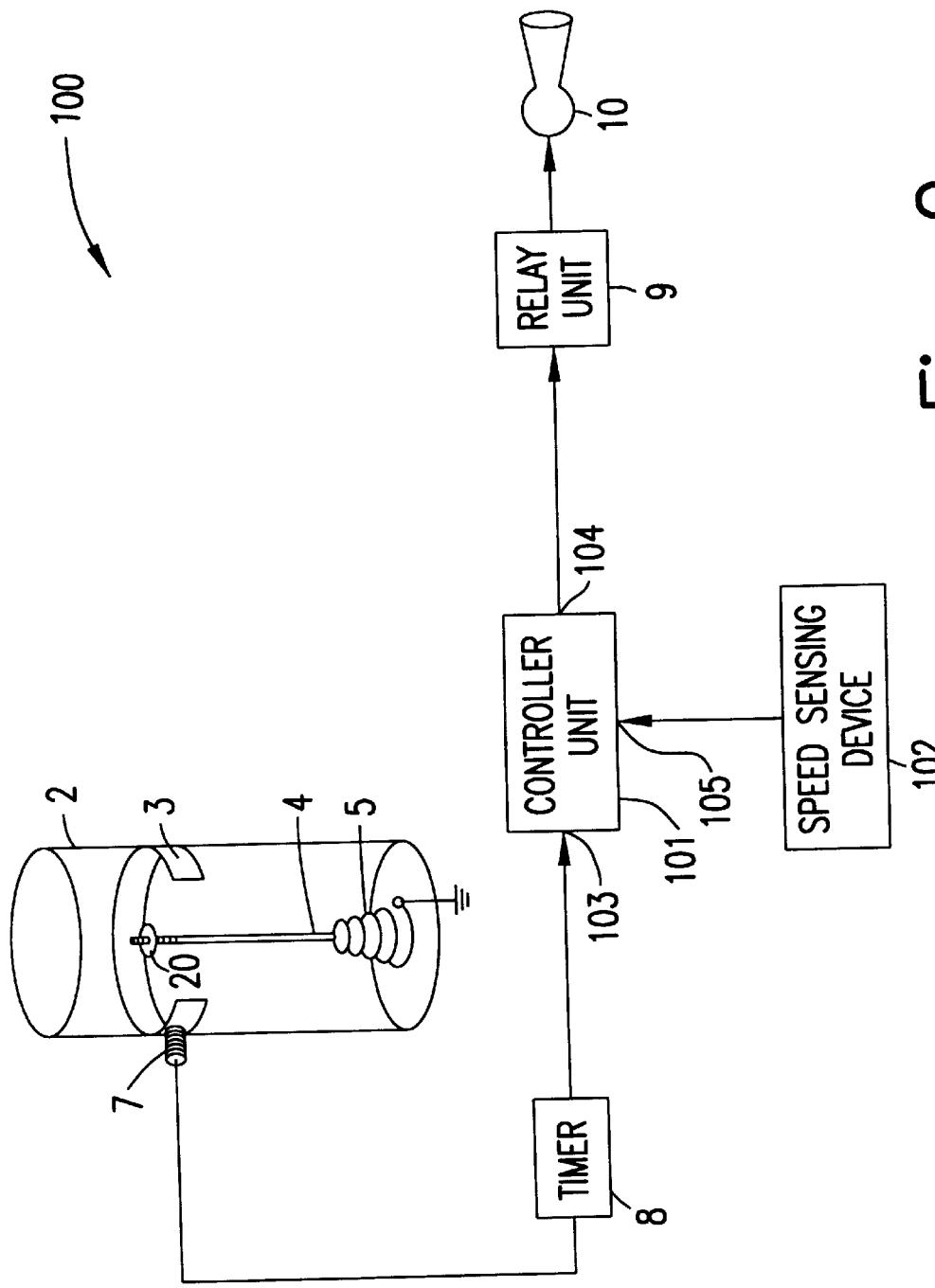
FIG. 2 shows a block diagram of a second embodiment of the device according to the present invention.

A second embodiment of the device according to the present invention is shown in FIG. 2. The device 100 includes all of the elements of the device 1 shown in FIG. 1. In addition, the device 100 includes a controller unit 101 having a first controller end 103 electrically coupled to the timing unit 8, and a second controller end 104 electrically coupled to the relay unit 9. As in the first embodiment, the relay unit 9 is coupled to the automobile horn 10. The controller unit 101 also has a third controller end 105 electrically coupled to a speed sensing device 102. The speed sensing device 102 may be a stand alone speed sensor, a deceleration sensor, an existing speedometer device, a cruise control system, or other similar devices and systems (e.g., an air bag inflation sensor or a sensor indicating that a seat belt extension has been prevented). The speed sensing device 102 generates a signal representing a speed of the motor vehicle, and provides this speed signal to the third controller end 105 of the controller unit 101. The controller unit 101 sends an activation signal to the automobile horn 10 when the timing unit 8 provides a signal to the controller unit 101, and when the present value of the speed signal generated by the speed sensing device 102 is greater than or equal to a predetermined speed value (e.g., a value representing a speed of 20 mph). It is also possible to connect the first controller end 103 directly to the electrical coupling device 7. Therefore, the timing unit 8 would be connected between the second controller end 104 and the relay unit 9.

In operation, if the motor vehicle makes an evasive maneuver, the first electrical signal is generated by the electrical coupling device 7 so that the timing unit 8 can generate a second electrical signal as described above with respect to the device 1 according to the first embodiment of the present invention. The second electrical signal is then provided to the controller unit 101 by the timing unit 8. Additionally, the speed sensing device 102 provides the speed signal (corresponding to the speed of the motor vehicle) to the controller unit 101.

When the second electrical signal (generated by the timing unit 8) and the speed signal (generated by the speed sensing device 102) are received by the controller unit 101, the controller unit 101 evaluates the present value of the speed signal to determine whether the speed signal is greater than or equal to the predetermined speed value, which corresponds to a predefined speed of the motor vehicle. If the present value of the speed signal is greater than or equal to the predetermined speed value, the controller unit 101 provides the second electrical signal (generated by the timing unit 8) to the relay unit 9, which activates the automobile horn 10 to generate a sound. In this manner, the automobile horn 10 used in the second embodiment of the present invention does not generate a sound when, for example, the motor vehicle is being parked, or is in heavy traffic. In addition, if the timing unit 8 is coupled between the second controller end 104 of the controller unit 101 and the relay unit 9, the controller unit 101 provides the first electrical signal to the timing unit 8 when the present value of the speed signal received from the speed sensing device 102 is greater than or equal to the predetermined speed value.

Figure 3:
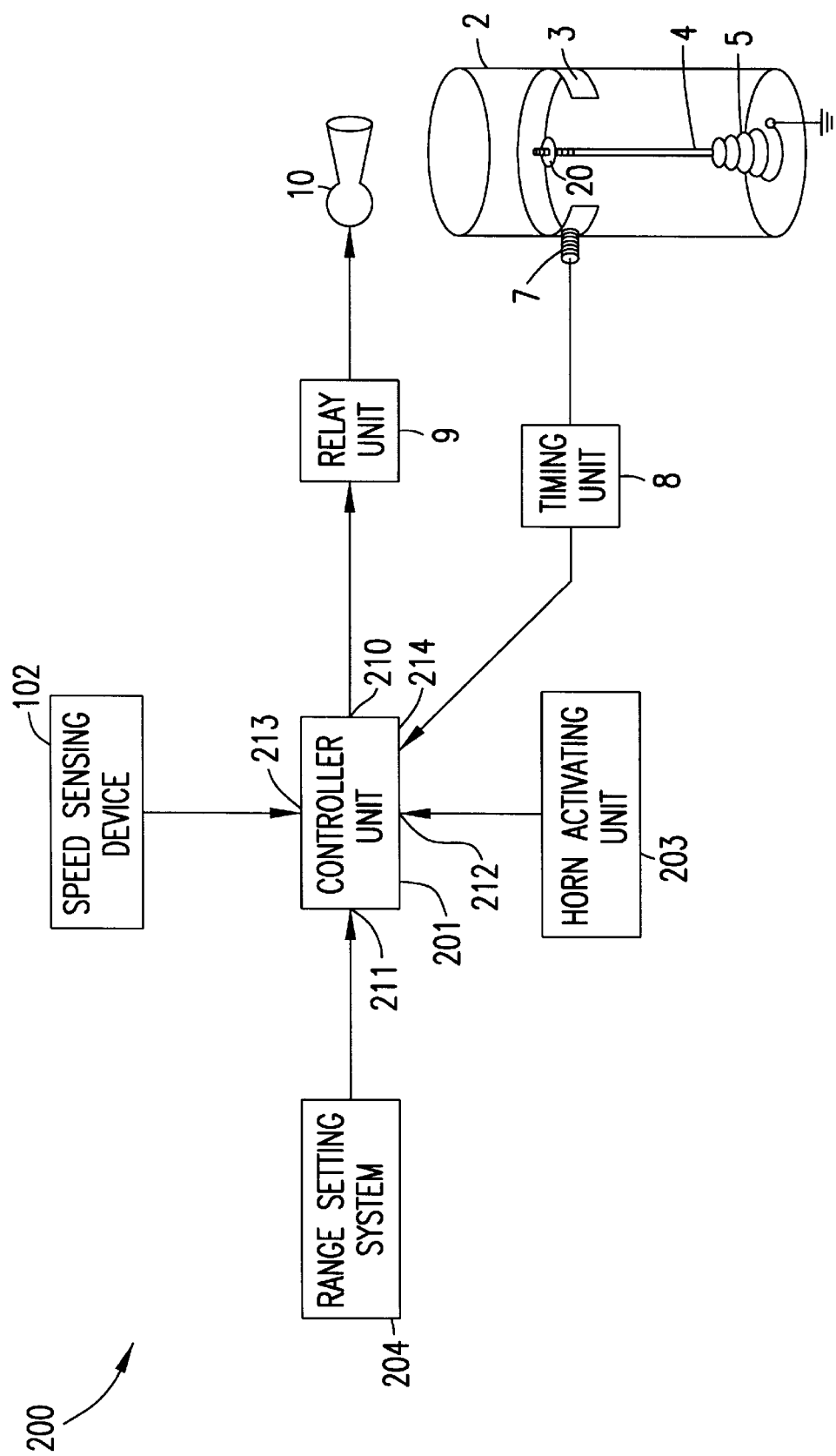
FIG. 3 shows a block diagram of a third embodiment of the device according to the present invention.

FIG. 3 shows a third embodiment of the device according to the present invention. This device 200 emits various audible signals (volume and/or pitch) from the automobile horn 10 as a function of the speed of the motor vehicle during an evasive maneuver (i.e., automatically) or when a driver depresses a horn button of the motor vehicle (i.e., manually). The device 200 includes all of the elements described in the device 1 shown in FIG. 1. In addition, the device 200 includes another controller unit 201 and a range setting system 204. The controller unit 201 has an output end 210 electrically coupled to the relay unit 9, a first input end 211 electrically coupled to the range setting system 204, a second input end 212 electrically coupled to a horn activating unit 203, a third input end 213 electrically coupled to the speed sensing device 102 (described above with respect to the second embodiment according to the present invention), and a fourth input end 214 electrically coupled to the timing unit 8 (which is connected to the components of the device 1 according to the first embodiment of the present invention as shown in FIG. 1).

As described above, the speed sensing device 102 generates the speed signal representing a speed of the motor vehicle. This speed signal is provided at the third input end 213 of the controller unit 201. The range setting system 204 provides range signals corresponding to at least two (2) driving conditions (e.g., city driving and highway driving). However, the range signals for three (3) or more driving conditions may be preferable (e.g., city driving, normal driving and highway driving). The ranges may be initially preset (e.g., city driving—below 25 mph, normal driving—between 25 and 50 mph, and highway driving—above 50 mph). These ranges are only exemplary and may differ, as would be clearly understood by those of ordinary skill in the art. The ranges may also be adjusted before and/or after installing the device 200 according to the present invention.

The horn activating unit 203 (e.g., a horn button) provides a manually actuated horn signal to the second input end 212 of the controller unit 201. Thus, the horn signal is generated by the horn activating unit 203 when the driver manually activates (e.g., depresses) the horn activating unit 203. The timing unit 8 provides the second electrical signal at the fourth input end 214 of the controller unit 201. The operation of the timing unit 8 and the generation of the second electrical signal are described in detail above with respect to the first and second embodiments according to the present invention.

The controller unit 201 then generates an output signal at the output end 210. If the manual horn signal is provided to the controller unit 201 by the horn activating unit 203, the controller unit 201 would request the range signals from the range setting system 204. The controller unit 201 also receives the speed signal from the speed sensing device 102. After receiving the range signals and the speed signal, the controller unit 201 determines in which range of speeds the motor vehicle is traveling, and generates the output signal which includes volume and/or pitch values corresponding to the appropriate range. The output signal is provided to the relay unit 9, which in turn provides the output signal to the horn activating unit 10. The horn activating unit 10 generates an audible sound with a predetermined volume and/or pitch corresponding to the range (e.g., the conditions) in which the motor vehicle is operated.

The operation of the controller unit 201 when the timing unit 8 generates the second signal is described above with respect to the second embodiment according to the present invention. In particular, the controller unit 201 sends the output signal to the automobile horn 10 via the relay unit 9 when the timing unit 8 provides the second electrical signal (or when the electrical coupling device 7 provides the first electrical signal) to the controller unit 201, and when the present value of the speed signal generated by the speed sensing device 102 is greater than or equal to a predetermined speed value (e.g., a value representing a speed of 20 mph). In addition, when the controller unit 201 determines that the second electrical signal, or the first electrical signal, is being provided (indicating that an evasive maneuver is taking place), the controller unit 201 generates the output signal corresponding to the highest range (i.e., the highest volume and/or pitch, which is usually reserved for the highway driving) to warn other drivers that an evasive maneuver is taking place.

Figure 4:
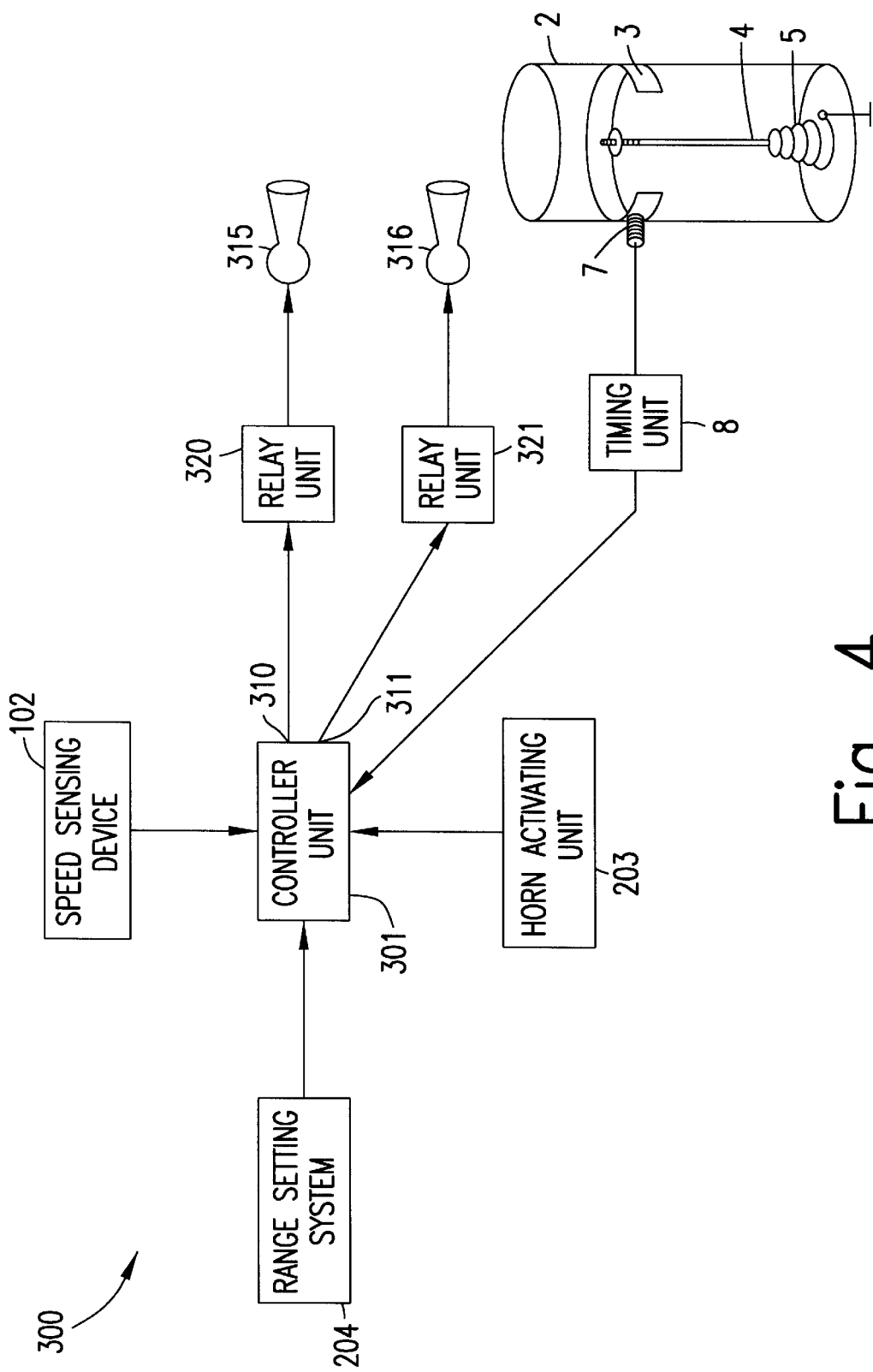
FIG. 4 shows a block diagram of a fourth embodiment of the device according to the present invention.

A device 300 according to the fourth embodiment of the present invention is shown in FIG. 4. The device 300 is substantially similar to the device 200 according to the third embodiment of the present invention (see FIG. 3). However, the controller unit 301 differs from the controller unit 201 in that the controller unit 301 of the device 300 has a first output end 310 and a second output end 311. The first output end 310 is coupled a first horn unit 315 via a first relay unit 320, and the second output end 311 is coupled to a second horn 316 via a second relay unit 321.

As an example of an operation of the device 300, when the motor vehicle travels at a speed below a predetermined speed (e.g., below 25 mph), the controller unit 301 can send a first output signal to the first horn unit 315 via the first output end 310 to emit a low level volume and/or pitch sound. When the motor vehicle travels at a speed in a range of, for example, 25 mph to 50 mph, the controller unit 301 may also send a second output signal to the second horn unit 316 via the second output end 311 to emit a medium level volume and/or pitch sound. When the motor vehicle's speed reaches the highest range (e.g., above 50 mph) or when an evasive maneuver occurs (while the motor vehicle is being driven over a predetermined speed), the controller unit 301 may generate both the first and second output signals to the respective first and second horn units 315 and 316 to emit a highest level volume and/or pitch sound.

Figure 5:
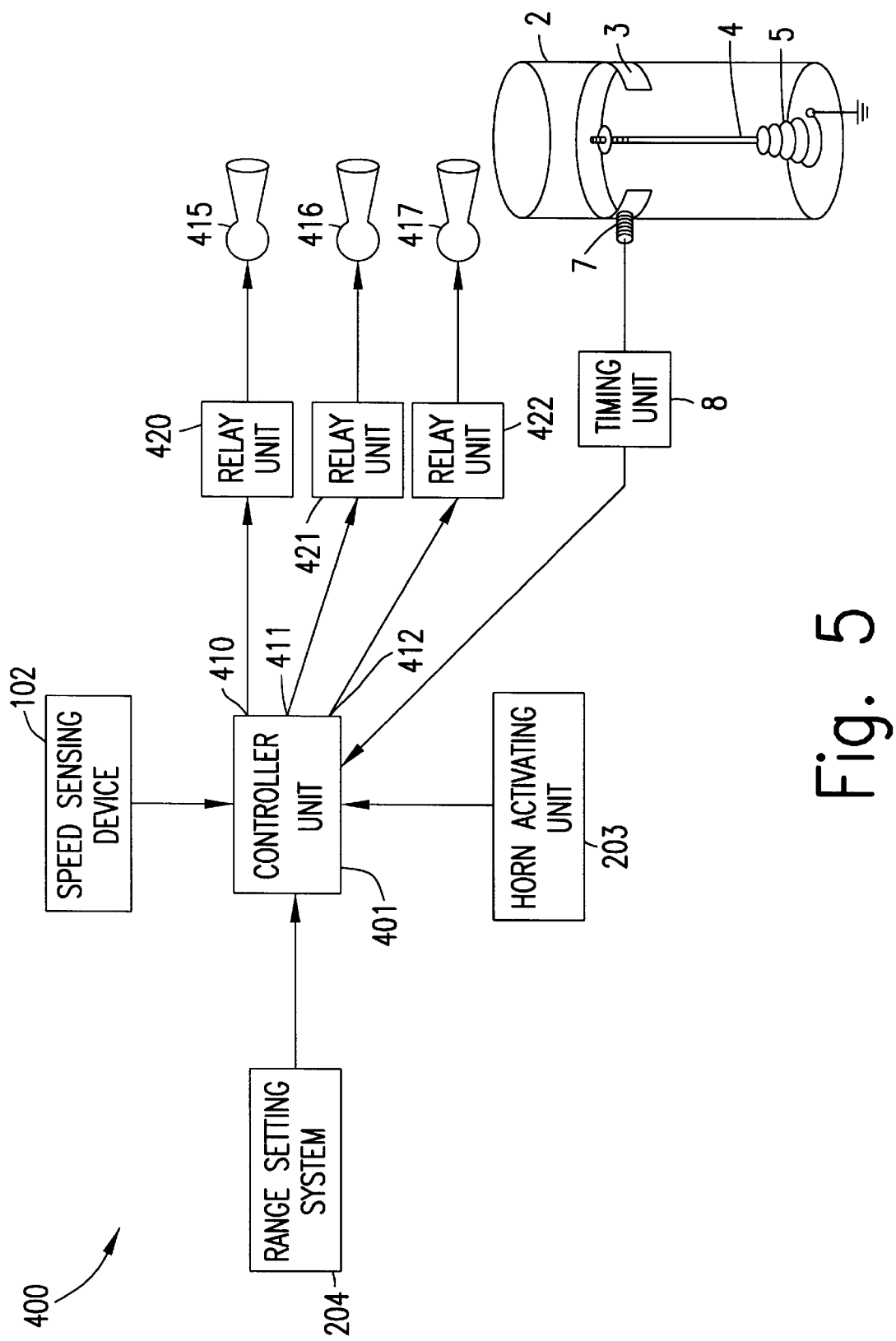
FIG. 5 shows a block diagram of a fifth embodiment of the device according to the present invention.

A device 400 according to the fifth embodiment of the present invention is shown in FIG. 5. The device 400 is substantially similar to the device 300 according to the fourth embodiment of the present invention (see FIG. 4). However, the controller unit 401 differs from the controller unit 301 in that the controller unit of the device 400 has three output ends 410, 411 and 412. The first output end 410 is coupled a first horn unit 415 via a first relay unit 420, the second output end 411 is coupled to a second horn 416 via a second relay unit 421, and the third output end 412 is coupled to a third horn 417 via a third relay unit 422.

As an example of an operation of the device 400, when the motor vehicle travels at a speed below a predetermined speed (e.g., below 25 mph), the controller unit 401 can send a first output signal to the first horn unit 415 via the first output end 410 to emit a low level volume and/or pitch sound. When the motor vehicle travels at a speed in a range of, for example, 25 mph to 50 mph, the controller unit 401 may also send a second output signal to the second horn unit 416 via the second output end 411 to emit a medium level volume and/or pitch sound. When the motor vehicle's speed reaches the highest range (e.g., above 50 mph) or when an evasive maneuver occurs (while the motor vehicle is being driven over a predetermined speed), the controller unit 401 may generate the third output signal to the third horn unit 417 to emit a highest level volume and/or pitch sound.

What is claimed is:

1. A device for generating an audible signal via an audible unit in a motor vehicle, comprising:

a first unit situated substantially in the motor vehicle, the first unit including a first contacting portion and a spring member;

a second unit closely situated to the first unit and including a second contacting portion, the second contacting portion electrically connecting with the first contacting portion to generate an activating signal when the motor vehicle performs an evasive maneuver, wherein the spring member prevents the first contacting portion from electrically contacting the second contacting portion when the motor vehicle does not perform the evasive maneuver; and a third unit having a first end electrically communicating with the second contacting portion and a second end providing an output signal to the audible unit, for generating the audible signal, in response to the activating signal.

2. The device according to claim 1, wherein the first unit includes a striking member, and the second unit includes an enclosing member, the striking member being positioned within the enclosing member, and wherein the first contacting portion extends along the striking member, and the second contacting portion extends around an inner portion of the enclosing member.

3. The device according to claim 2, wherein the first unit includes an attaching portion connected to the motor vehicle, and wherein the attaching portion is coupled to the spring member, the spring member biasing the first contacting portion of the first unit to avoid contacting the second contacting portion of the second unit.

4. The device according to claim 2, wherein the striking member is vertically oriented by the spring member when the evasive maneuver is not being performed.

5. The device according to claim 1, wherein the output signal is provided for a predetermined time period.

6. The device according to claim 1, further comprising:

a relay unit coupled between the second end of the third unit and the audible unit, the relay unit providing the output signal generated by the third unit to the audible unit.

7. The device according to claim 1, further comprising:

a speed sensor device detecting a speed of the motor vehicle and generating a speed signal indicative of the speed, wherein the third unit generates the output signal as a function of the speed signal.

8. A device for generating an audible signal via an audible unit in a motor vehicle, comprising:

a first unit situated substantially in the motor vehicle and including a first contacting portion;

a second unit closely situated to the first unit and including a second contacting portion, the second contacting portion electrically connecting with the first contacting portion to generate an activating signal when the motor vehicle performs an evasive maneuver;

a third unit having a first end electrically communicating with the second contacting portion and a second end providing an output signal to the audible unit, for generating the audible signal, in response to the activating signal;

a controller having
     a first input end receiving a speed signal from a speed sensing system,
     a second input end receiving a horn signal from a horn activating unit when the horn activating unit is actuated,
     a third input end receiving an output signal from the third unit, and
     an output end electrically communicating with the audible unit; and a range setting system providing range signals to a fourth input end of the controller, the range signals corresponding to a predetermined range of speeds of the motor vehicle and including first range signals and second range signals, each of the first and second range signals having a highest speed value and a lowest speed value, wherein the controller generates a first horn signal to the audible unit for emitting at least one of a low pitch sound and a low volume sound when a value of the speed signal of the motor vehicle is between the lowest and highest speed values of the first range signals and when the horn signal is generated by the horn activating unit, and wherein the controller generates a second horn signal to the audible unit for emitting at least one of a high pitch sound and a high volume sound when the value of the speed signal of the motor vehicle is between the lowest and highest speed values of the second range signals and when the horn signal is generated by the horn activating unit.

9. The device according to claim 8, wherein the lowest speed value of the first range signals is 0 and the highest speed value of the first range signals is 25, and wherein the lowest speed value of the second range signals is 26 and the highest speed value of the second range is 50.

10. The device according to claim 8, wherein the range signals generated by the range setting system further include third range signals, and wherein the controller generates a third horn signal to the audible unit for emitting at least one of a highest pitch sound and a highest volume sound when a value of the speed signal of the motor vehicle is above the highest speed value of the second range signals.

11. The device according to claim 8, wherein the controller provides the second horn signal to the audible unit for emitting at least one of a high pitch sound and a high volume sound when the output signal is received at the third input end of the controller.

12. A device for generating an audible signal via an audible unit in a motor vehicle, comprising:

a first unit situated substantially in the motor vehicle and including a first contacting portion;

a second unit closely situated to the first unit and including a second contacting portion, the second contacting portion electrically connecting with the first contacting portion to generate an activating signal when the motor vehicle performs an evasive maneuver;

a third unit having a first end electrically communicating with the second contacting portion and a second end providing an output signal to the audible unit, for generating the audible signal, in response to the activating signal;

a controller having
  a first input end receiving a speed signal from a speed sensing system,
  a second input end receiving a horn signal from a horn activating unit when the horn activating unit is actuated,
  a third input end receiving an output signal from the third unit, and
  an output end electrically communicating with the audible unit; and a range setting system providing range signals to a fourth input end of the controller, the range signals corresponding to a predetermined range of speeds of the motor vehicle and including first range signals and second range signals, each of the first and second range signals having a highest speed value and a lowest speed value, wherein the controller provides the output signal to the audible unit for emitting at least one of a low pitch sound and a low volume sound when a value of the speed signal of the motor vehicle is between the lowest and highest speed values of the first range signals and when the horn signal is generated by the horn activating unit, and wherein the controller provides the output signal to an additional audible unit for emitting at least one of a medium pitch sound and a medium volume sound when the value of the speed signal of the motor vehicle is between the lowest and highest speed values of the second range signals and when the horn signal is generated by the horn activating unit.

13. The device according to claim 12, wherein the lowest speed value of the first range signals is 0 and the highest speed value of the first range signals is 25, and wherein the lowest speed value of the second range signals is 26 and the highest speed value of the second range is 50.

14. The device according to claim 12, wherein the range signals generated by the range setting system further include third range signals, and wherein the controller provides the output signal to the audible unit and to the additional audible unit for emitting at least one of a high pitch sound and a high volume sound when a value of the speed signal of the motor vehicle is above the highest speed value of the second range signals.

15. The device according to claim 12, wherein the range signals generated by the range setting system further include third range signals, and wherein the controller provides the output signal to a further audible unit for emitting at least one of a high pitch sound and a high volume sound when a value of the speed signal of the motor vehicle is above the highest speed value of the second range signals.

* * * * *